United States Patent
Shah et al.

(10) Patent No.: US 8,904,156 B2
(45) Date of Patent: Dec. 2, 2014

(54) PERCEPTRON-BASED BRANCH PREDICTION MECHANISM FOR PREDICTING CONDITIONAL BRANCH INSTRUCTIONS ON A MULTITHREADED PROCESSOR

(75) Inventors: Manish K. Shah, Austin, TX (US); Gregory F. Grohoski, Bee Cave, TX (US); Robert T. Golla, Round Rock, TX (US); Jama I. Barreh, Austin, TX (US)

(73) Assignee: Oracle America, Inc., Redwood Shores, CA (US)

(*) Notice: Subject to any disclaimer, the term of this patent is extended or adjusted under 35 U.S.C. 154(b) by 1181 days.

(21) Appl. No.: 12/578,859

(22) Filed: Oct. 14, 2009

(65) Prior Publication Data

US 2011/0087866 A1    Apr. 14, 2011

(51) Int. Cl.
*G06F 9/38* (2006.01)

(52) U.S. Cl.
CPC .............. *G06F 9/383* (2013.01); *G06F 9/3836* (2013.01); *G06F 9/3848* (2013.01); *G06F 9/3851* (2013.01); *G06F 9/384* (2013.01)
USPC ........................................................ 712/239

(58) Field of Classification Search
CPC .............................. G06F 9/3836; G06F 9/3842
See application file for complete search history.

(56) References Cited

U.S. PATENT DOCUMENTS

| 5,961,638 | A | 10/1999 | Tran |
| 6,477,639 | B1 | 11/2002 | Krishnan et al. |
| 6,587,894 | B1 * | 7/2003 | Stracovsky et al. ............... 710/6 |
| 7,441,110 | B1 | 10/2008 | Puzak et al. |
| 2005/0228977 | A1 * | 10/2005 | Cypher et al. ................ 712/240 |

OTHER PUBLICATIONS

Emma et al., "Comprehensive Branch Prediction Mechanism for BC", IBM Technical Disclosure Bulletin, Oct. 1985, US, vol. 28, issue No. 5, pp. 2255-2262.*

* cited by examiner

*Primary Examiner* — Andrew Caldwell
*Assistant Examiner* — John Lindlof
(74) *Attorney, Agent, or Firm* — Meyertons Hood Kivlin Kowert & Goetzel; Stephen J. Curran

(57) ABSTRACT

A multithreaded microprocessor includes an instruction fetch unit including a perceptron-based conditional branch prediction unit configured to provide, for each of one or more concurrently executing threads, a direction branch prediction. The conditional branch prediction unit includes a plurality of storages each including a plurality of entries. Each entry may be configured to store one or more prediction values. Each prediction value of a given storage may correspond to at least one conditional branch instruction in a cache line. The conditional branch prediction unit may generate a separate index value for accessing each storage by generating a first index value for accessing a first storage by combining one or more portions of a received instruction fetch address, and generating each other index value for accessing the other storages by combining the first index value with a different portion of direction branch history information.

20 Claims, 7 Drawing Sheets

PERCEPTRON-BASED BRANCH PREDICTION MECHANISM FOR PREDICTING CONDITIONAL BRANCH INSTRUCTIONS ON A MULTITHREADED PROCESSOR

BACKGROUND OF THE INVENTION

1. Field of the Invention

This invention relates to microprocessors and, more particularly, to branch prediction mechanisms.

2. Description of the Related Art

Modern superscalar microprocessors achieve high performance by executing multiple instructions in parallel and out-of-program-order. These processors may fetch multiple instructions every cycle from an instruction cache. As a result, multiple conditional branches may be fetched every cycle. However, branch instructions can cause pipelined microprocessors to stall because instructions after a branch are not known until the branch instruction is executed. This can result in significant losses in performance.

To achieve high performance, these multiple conditional branches need to be predicted every cycle. Accordingly, many microprocessors employ branch prediction techniques to speculatively fetch and execute instructions beyond branches. However, if the branch is mispredicted, then all instructions that were speculatively fetched beyond the branch have to be thrown away, or flushed from the pipeline and new instructions have to be fetched from the correct path. This results in loss of performance and waste of power. Thus, the accuracy of the branch prediction mechanism in predicting the direction and target of the branches can greatly impact the performance of the microprocessor.

Many modern microprocessors also implement chip level multi-threading (CMT) to improve performance. In a CMT processor, multiple software threads may be concurrently active. Efficient execution of instructions from multiple software threads requires the ability to predict conditional branches from different threads. Modern branch predictors predict branches by exploiting the property that the taken/not-taken behavior of most conditional branches is correlated with the behavior of previously executed branches of same software thread. However, execution of multiple threads on CMT processors causes execution of branches from different threads to be interleaved. This interleaved execution of branches from different threads causes the behavior of a given branch to no longer be correlated to the behavior of previously executed branches in the machine, and the performance of the branch predictor significantly degrades.

SUMMARY

Various embodiments of a perceptron-based branch prediction mechanism are disclosed. In one embodiment, a multithreaded microprocessor includes an instruction fetch unit configured to fetch and maintain a plurality of instructions belonging to one or more threads. The processor may also include one or more execution units configured to concurrently execute the one or more threads. The instruction fetch unit includes a conditional branch prediction unit configured to provide, for each of the one or more threads, a direction branch prediction in response to receiving an instruction fetch address of a current conditional branch instruction. The conditional branch prediction unit includes a plurality of storages such as weight tables, for example, each including a plurality of entries. Each entry may be configured to store one or more prediction values. Each prediction value of a given storage may correspond to at least one conditional branch instruction in a cache line. The conditional branch prediction unit also includes a control unit configured to generate a separate index value for accessing each storage. The control unit may be configured to generate a first index value for accessing a first storage by combining one or more portions of the instruction fetch address using, for example, a hash function. The control unit may also be configured to generate each other index value for accessing the other storages by combining the first index value with a different portion of direction branch history information for each storage. Thus, each direction branch prediction may correlate to the fetch address and the direction branch history of the thread to which the current branch instruction belongs.

Figure 1:
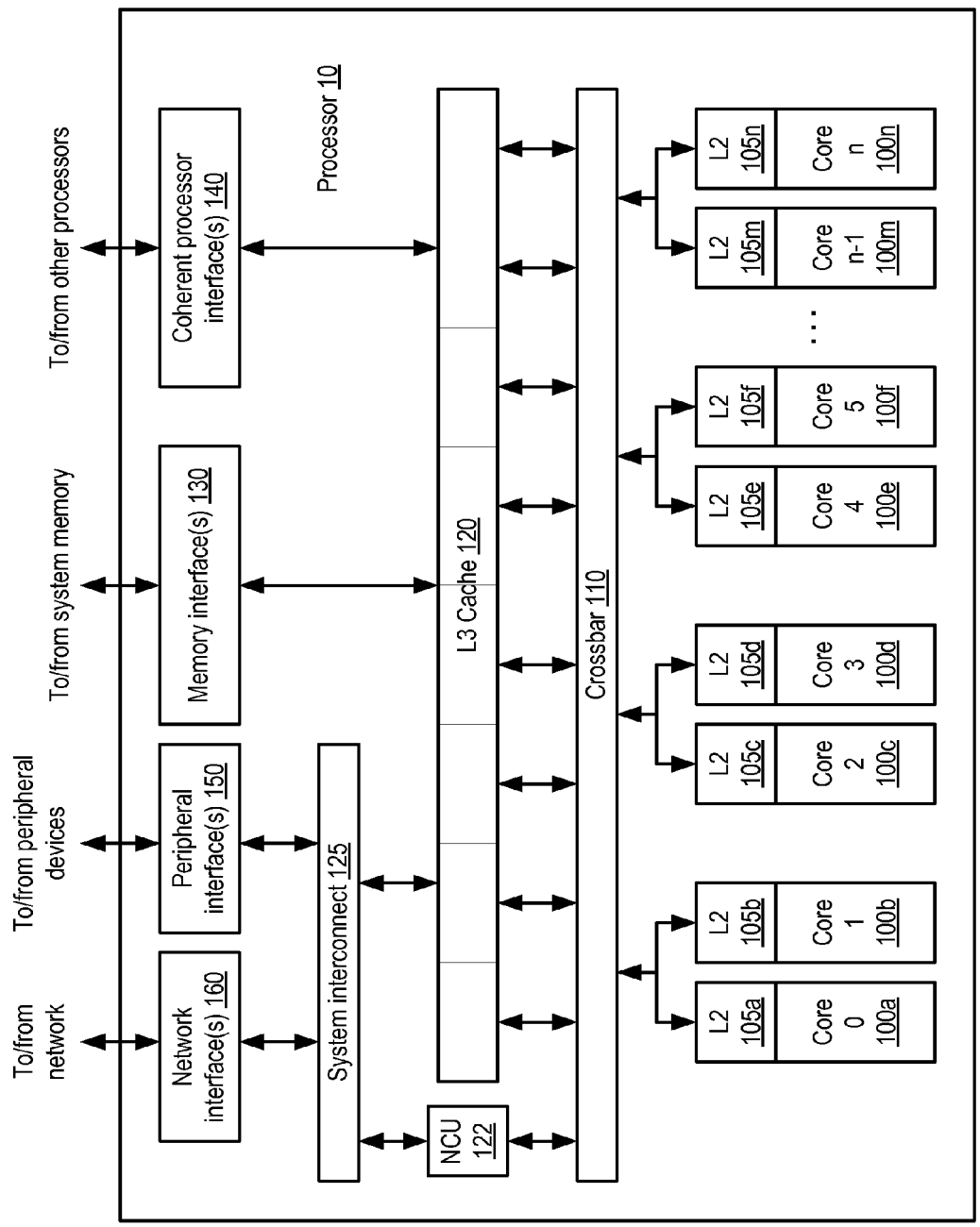
FIG. 1 is a block diagram of one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Overview of Multithreaded Processor Architecture

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8-megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requestors.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example, in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor—bound—completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
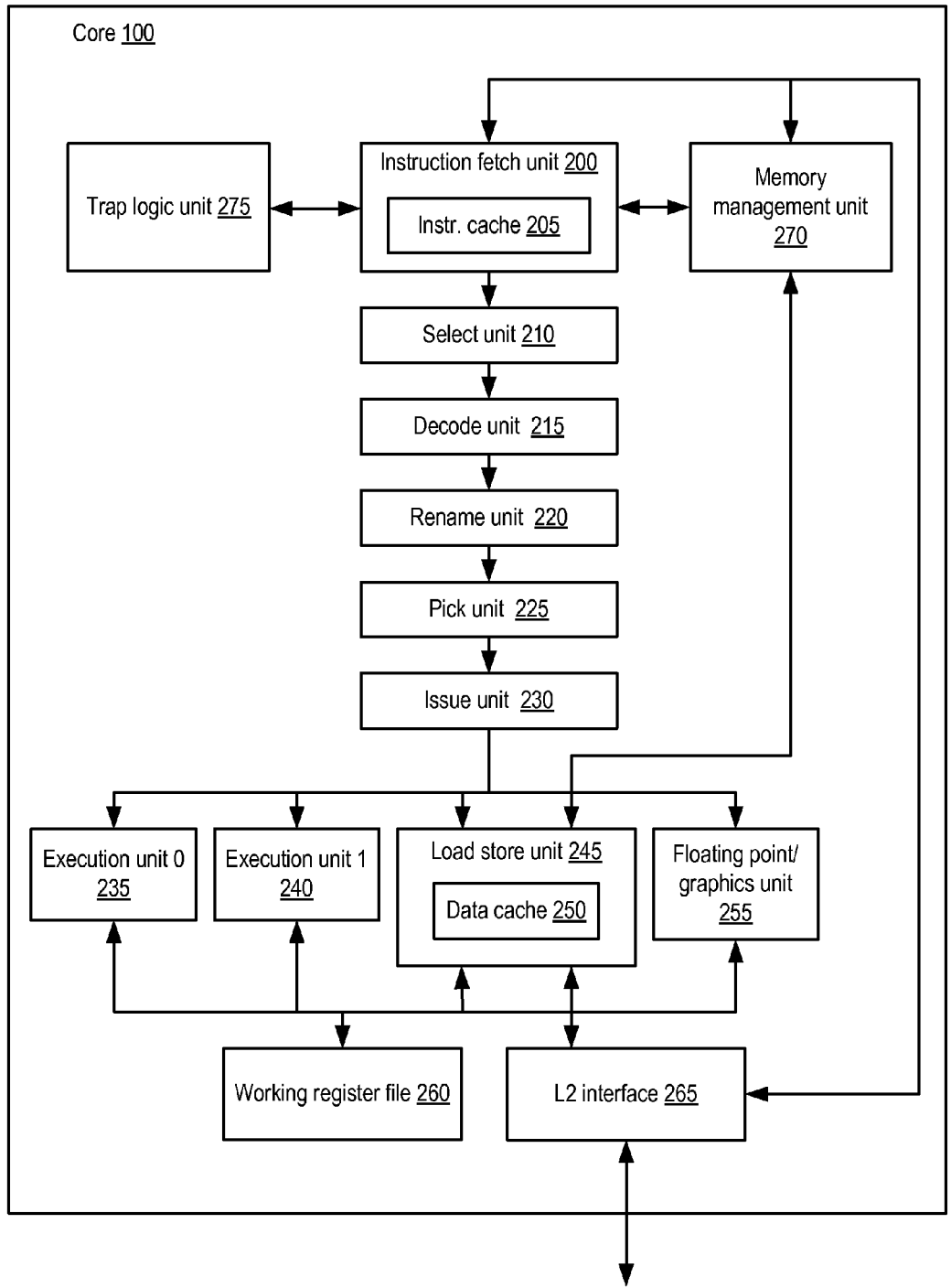
FIG. 2 is a block diagram of one embodiment of a processor core of the multithreaded processor shown in FIG. 1.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and as described in greater detail below, predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may implement a target branch predictor for predicting target addresses of indirect branches. In addition, as described further below in conjunction with the descriptions of FIG. 3 through FIG. 6, in one embodiment IFU 200 may implement a perceptron-based dynamic branch predictor (e.g., DBPU 310 of FIG. 3 and FIG. 4) to predict the direction of conditional branches.

To implement branch prediction, IFU 200 may implement a variety of control and data structures in various embodiments, such as history registers that track prior branch history (shown in FIG. 3 and FIG. 4), weight tables that reflect relative weights or strengths of predictions, and/or target data structures (shown in FIG. 3 through FIG. 5) that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed. If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requestors. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Figure 3:
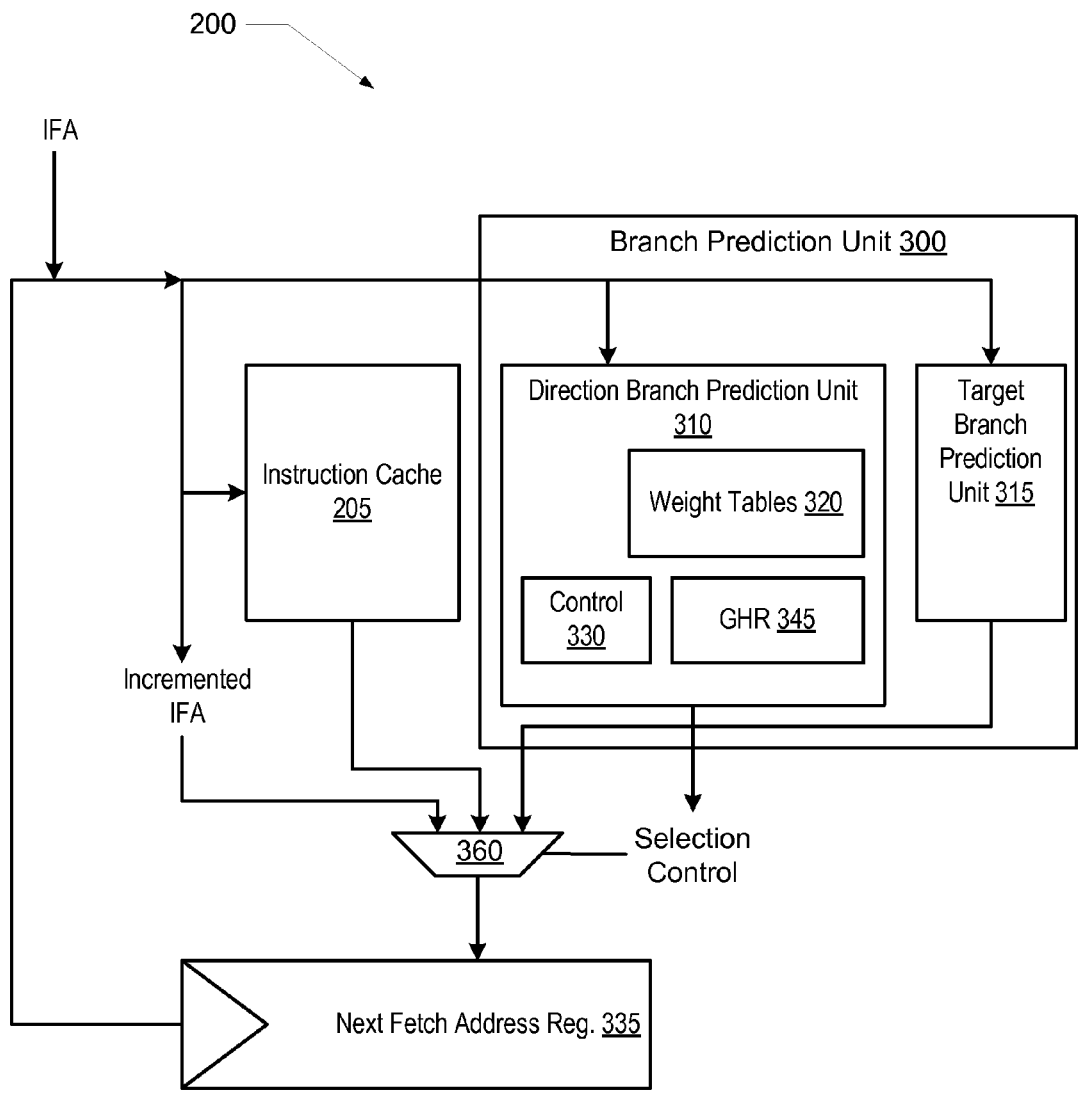
FIG. 3 is a block diagram of one embodiment of the fetch unit including a branch prediction unit of the processor cores of FIG. 1 and FIG. 2.

Turning now to FIG. 3, an architectural block diagram illustrating more detailed aspects of the IFU 200 are shown. More particularly, in the embodiment shown in FIG. 3, the IFU 200 includes an instruction cache 205 which is coupled to a multiplexer 360, which is coupled to a next fetch address register 335. The IFU 200 also includes branch prediction unit (BPU) 300, which is also coupled to the multiplexer 360.

In the illustrated embodiment, the BPU 300 includes a direction branch prediction unit 310, which includes a control unit 330, a global history register (GHR) 345, and weight tables 320. The BPU also includes a target branch prediction unit 315. As described above, the IFU 200 may implement history registers that track prior branch history. Accordingly, in FIG. 3, GHR 345 may store branch history information on a per thread basis and in one embodiment GHR 345 may provide separate global branch history storage for each thread. In one embodiment, GHR 345 may store branch direction history (e.g., taken/not taken history) for each thread. Accordingly, in one embodiment, GHR 345 may be implemented as multiple multi-bit shift registers, (one for each thread) in which a one or a zero is shifted in for each conditional branch instruction is executed. Thus, GHR 345 may provide deep branch direction history for each thread. In one embodiment, if the branch is taken a logic value of one may be shifted in, and if the branch is not taken, a logic value of zero may be shifted in. However, it is contemplated that in other embodiments a zero may be representative of a taken branch and a one may be representative of a not taken branch. In one embodiment, there may be a number of copies of GHR 345. In such an embodiment, one copy may store, for example, a speculative version, and if a branch is mis-predicted, the appropriate shift register of GHR 345 may be updated with the actual taken/not taken result.

In one embodiment, the weight tables 320 represent a number of weight tables, and each weight table may includes a number of entries. Each entry may be configured to store several prediction values. Each prediction value may be representative of the probability of a respective branch instruction being taken. For example, each cache line in the instruction cache 205 may include eight instructions. In one embodiment, each prediction value in a given entry of a weight table may correspond to a pair of instructions in the cache line being accessed via the current IFA. As described further below, various combinations of bits of the instruction fetch address (IFA) may be combined together and with portions of the GHR 345 for the executing thread to generate index values for accessing the weight tables 320.

Accordingly, when an IFA is received, it may be presented to the instruction cache 205, and the branch prediction unit 300. Depending on the type of branch instruction, the target address of the branch may be predicted or obtained from information stored in the instruction cache 205. Control signals may select the source based upon the above considerations. If the instruction is an indirect branch instruction, the branch target address may be provided by the target branch prediction unit 315. However, if the instruction is a conditional branch, as described in greater detail below in conjunction with the descriptions of FIG. 4 through FIG. 6, the direction branch prediction unit may use the prediction information stored in the weight tables to determine whether a branch instruction is taken or not, and thus select the next fetch address.

Figure 4:
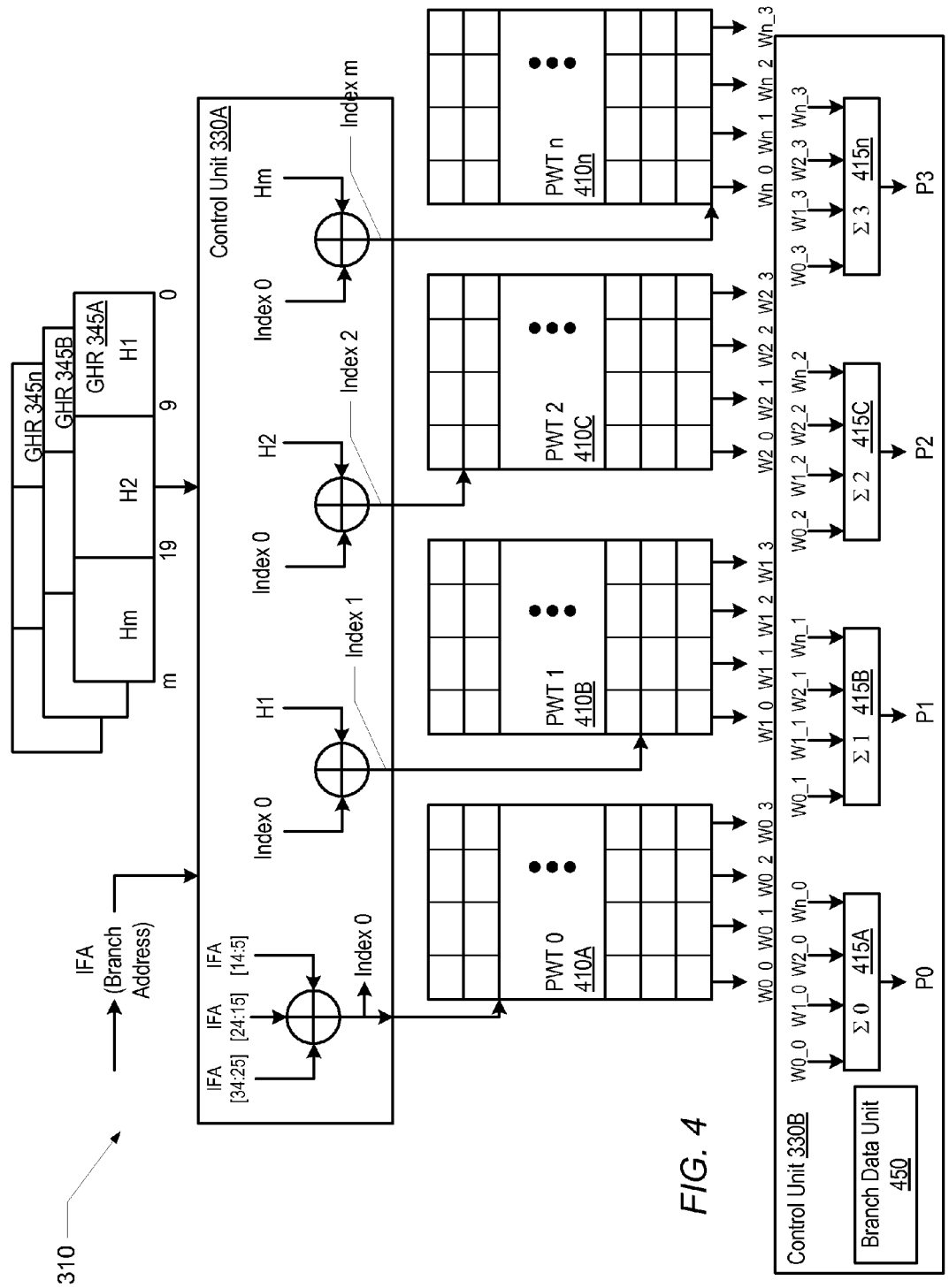
FIG. 4 is a block diagram of one embodiment of the direction branch prediction unit of FIG. 3.

Referring to FIG. 4, a block diagram of one embodiment of the direction branch prediction (DBP) unit 310 is shown. It is noted that components that correspond to those shown in FIG. 3 are numbered identically for clarity and simplicity. The DBP unit 310 includes a control unit 330 (shown as 330A and 330B) that is coupled to global history registers 345A through 345n, where n may be any number. The control unit 330 is also coupled to the perceptron weight tables PWT0 through PWTn (410A-410n), where n may be any number.

As mentioned above, the global history registers 345 may store global branch history information on a per thread basis. Accordingly, in one embodiment, each of GHR 345A-345n may correspond to a respective or different thread, and each GHR 345A-345n may store branch direction information (e.g., taken/not taken) in the form of a number of ones and zeros. For example, as described above each GHR 345 may be a shift register which holds a number of bits and each bit is an indication of a conditional branch taken or not taken. In one embodiment, each time a conditional branch instruction is executed, the actual direction of the branch may be compared with the predicted direction and if there is a misprediction, the GHR 345 may be updated by logic (not shown) in the IFU 200. However, in other embodiments, the GHR 345 may be provided the actual direction information after the instruction is executed. As shown in FIG. 4, each GHR 345 has been segmented into a number of segments (e.g., H1-Hm), each including some number of bits as desired. For example, if a given GHR 345 includes 30 bits, each segment may be 10 bits.

In the illustrated embodiment, each of the weight tables 410 includes a number of entries. As mentioned above and shown in FIG. 4, each entry may store four prediction values, each of which corresponding to a pair of instructions in an instruction cache line. However, in other embodiments, there may be other numbers of prediction values stored in a given entry. In one implementation, a prediction value may be a six-bit value, representing a signed integer from −32 to 31, although other implementations are possible and contemplated. Also as mentioned above, each prediction value may represent a probability that the associated branch instruction will be taken. Accordingly, as the DBP unit 310 makes predictions, depending on the accuracy of each prediction, the values in the weight table may be incremented or decremented according to a specific update algorithm that is described further below.

In one embodiment, each of the weight tables 410 may be implemented as independently accessible memory arrays such as, for example, static random access memory (SRAM) arrays. To expedite array operations, updates (i.e. writes) to each weight table 415 may occur concurrently with read accesses. However as described in greater detail below in conjunction with the description of FIG. 5, to allow concurrent read and write access to a weight table without providing multiple ports, each SRAM array includes multiple independently accessible banks, and logic (shown in FIG. 5) to detect and handle collisions (i.e., between a read and write) to the same bank.

To access the weight tables 410, control unit 330 uses the current IFA and the global direction history information of the executing thread. More particularly, in one embodiment, each time an IFA is received, the control unit 330 generates a set of four index values to access the four weight tables. As shown in FIG. 4, control unit 330A generates the Index 0 to access weight table PWT0 by combining three separate (i.e., non-overlapping) segments of the IFA bits. In one embodiment, control unit 330A performs a hash function on three segments of the IFA. For example, the hash function may be a bit-wise Exclusive-OR (XOR) function on each bit in the ranges IFA [34:25], IFA[24:15], and IFA[14:5]. However, it is contemplated that in other embodiments, other hash functions may be performed and/or other bit ranges of the IFA may be used. In addition, to access weight table PWT1, control unit 330A may generate Index 1 by combining Index 0 with a segment (e.g., H1) of the branch history stored within GHR 345A, for example. In this example, GHR 345A corresponds to the currently executing thread. In a similar way Index 2 and Index m may be generated using Index 0 and segments H2 and H3, respectively of the branch history stored in GHR 345A.

In the illustrated embodiment, when the weight tables are accessed, the four prediction values in each table are read out and provided to summation units 415A through 415n. More particularly, the prediction values from the left-most column of the currently accessed entry of each table (e.g., W0_0-Wn_0) are provided to summation unit 415A. Similarly, the next columns of the currently accessed entry of each table are provided to summation units 415B-415n, as shown. The results of the summations (e.g., P0, P1, P2, P3) are branch predictions that correspond to up to four branch instructions for the current cache line. It is noted that in one embodiment, since the likelihood of back-to-back branch instructions is small, each prediction corresponds to a pair of instructions. Likewise, since the IFA may not correspond to the first instruction in the cache line, and since only four instructions may be fetched from a given cache line per cycle, these prediction values may be multiplexed out so that the appropriate prediction is consistently used for the corresponding instruction pairs in the cache line.

In one embodiment, in response to an IFA of a branch being presented to the control unit 330, the weight tables may be read early enough in the pipeline so that the prediction for each branch instruction being fetched is known and may be used to redirect the fetch address if the branch is predicted taken.

During operation, information corresponding to the branch instructions may be kept, for example, until the branch instructions have executed and the appropriate prediction values have been updated. More particularly, in one embodiment, control unit 330 may store branch information such as the IFA for the set of predictions, the prediction values read from the weight tables, each set of the predictions (e.g., P0-Pn), an indication of whether an update prediction threshold has been met, an indication of whether the branch was taken or not taken, and whether the branch was mispredicted, for example, within branch data unit 450.

Accordingly, this branch information may be used during updates of the GHR 345, and the weight tables. In one embodiment, when a conditional branch is executed, information corresponding to the actual direction of the branch (taken or not taken) and whether the branch was mispredicted is sent to the IFU 200 and may be stored within the branch data unit 450. Similarly, the prediction values that were read out of each weight table may also be saved to the branch data unit 450.

When the prediction values read out of the weight tables 410 are summed to create the predictions, control unit 330 may compare each prediction against a prediction threshold value. If the threshold value has not been met, the control unit 330 may update the prediction values corresponding to the executed branch even if the branch direction is accurately predicted. For example, in one embodiment, when the prediction values are summed together, a zero or positive value may indicate a taken branch, while a negative number may indicate a not taken branch. Thus, a prediction threshold may be set to a minimum value such as, for example, seven. Any prediction that is between plus and minus seven, may cause an update even if the prediction is accurate. In one embodiment, during an update, only the prediction values that correspond to the executed branch are updated. For example, in one embodiment, if instruction 0 (out of instructions 0-7 of a cache line) was executed, then only the predictions in the first column of the selected bank of each weight table may be updated.

It is noted that although four predictions are shown in the above embodiment, it is contemplated that in other embodiments, other numbers of predictions may be made each fetch cycle. Accordingly, in such embodiments, other numbers of prediction values may be stored with each weight table 410 and other numbers of summation units 415 may be used to produce the predictions. Likewise, it is contemplated that other numbers of weight tables 410 may be used in other embodiments, as desired. Further, it is contemplated that in other embodiments when the prediction values are summed together, a zero or negative value may indicate a taken branch, while a positive number may indicate a not taken branch. In such embodiments, incrementing and decrementing the values in the weight table prediction values may be reversed.

Figure 5:
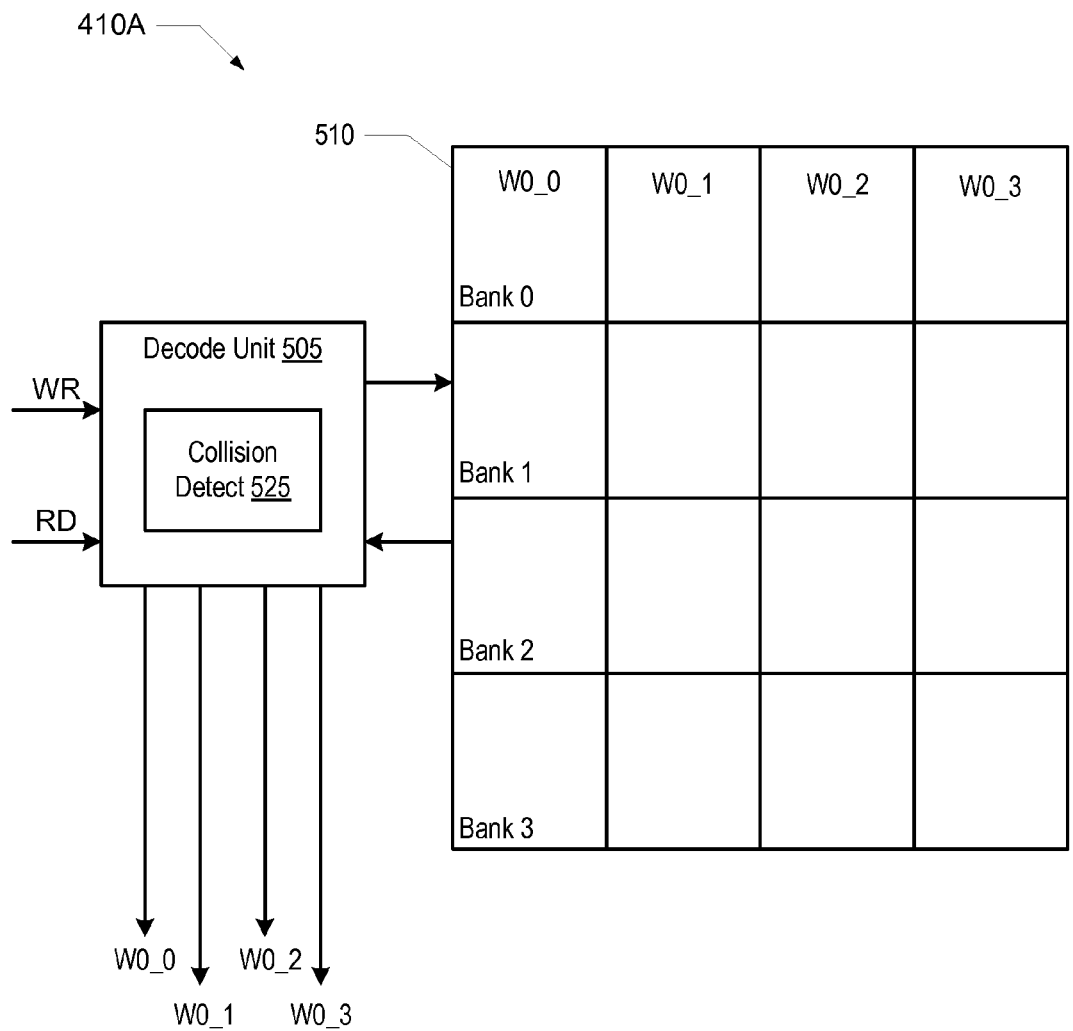
FIG. 5 is a block diagram of one embodiment of a weight table storage shown in FIG. 4.

Referring to FIG. 5, a block diagram of one embodiment of an exemplary weight table storage of FIG. 3 and FIG. 4 is shown. The weight table 410A is shown as an exemplary weight table. As mentioned above, in one embodiment, the weight tables 410 may be implemented as independently accessible SRAM arrays. Accordingly, weight table 410A of FIG. 5 includes a single port SRAM array 510 that is coupled to a decode unit 505. As shown, the decode unit 505 includes a collision detect unit 525.

The decode unit 505 is coupled to receive a read signal (RD) and a write signal (WR). For simplicity, the WR signal may also include an index and any write data that may be written into the weight table array 510 during, for example, an update, and the RD signal may include the index from which the read data will be read. The decode unit 505 is also coupled to provide the read data from the SRAM array 510.

As described above, to allow concurrent read and write access to weight table 410A, the SRAM array 510 includes multiple banks. In the illustrated embodiment, the SRAM array 510 is shown with four banks (e.g., bank 0 through bank 3). Accordingly, a write access to one bank may be made concurrently with a read access to a different bank. This arrangement allows for an update of the weight tables to occur while a read access is made for a new prediction, as long as the read and write accesses are to different banks.

However, in the event that there is a read and write to an address in the same bank (i.e., a bank collision), in one embodiment the collision detect unit 525 may detect the collision and allow the write access to occur. The read access to the array 510 will be aborted, and the collision detect unit 525 may cause the read data to be all zeros. However, if the write address and the read address are the same (i.e., the read and write access is to the same prediction value), the collision detect unit 525 will allow the write operation to occur and may additionally output the write data as the read data (e.g., W0_0 through W0_3). Thus, the read data will be the most updated version of the prediction values.

This mechanism may allow an update to occur, which may allow future predictions to be more accurate. Since the likelihood of such a collision occurring on more that one weight table during a given access is low, having a zero value from one table (or even two tables) may impact the present prediction as little as possible. Thus, having a single port array with the above collision detection mechanism may allow the direction branch prediction unit 310 to provide accurate predictions while saving die area when compared to a multi-port SRAM array.

Figure 6:
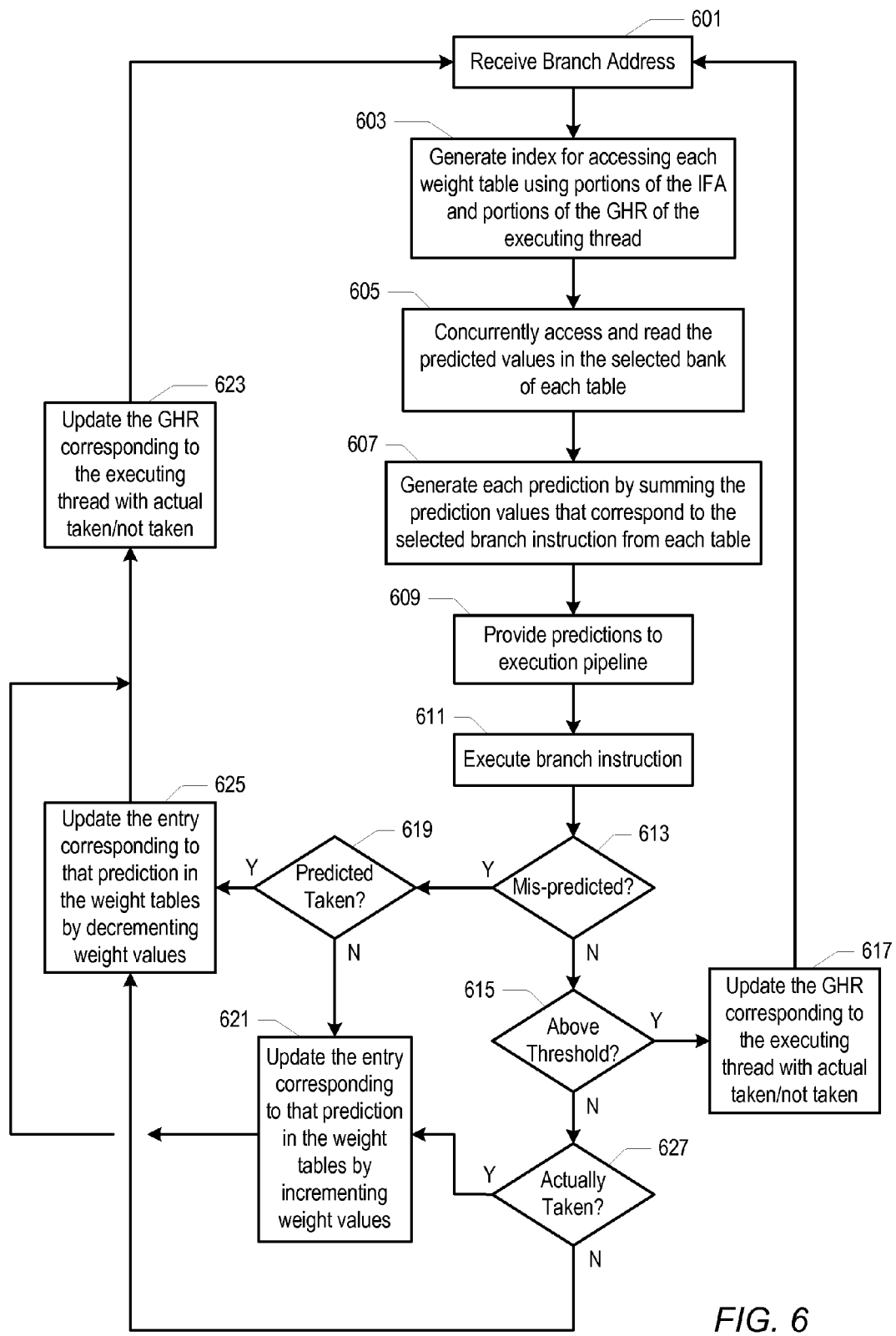
FIG. 6 is a flow diagram depicting operational aspects of the direction branch prediction unit of FIG. 3 through FIG. 5.

Turning to FIG. 6, a flow diagram depicting operational aspects of the direction branch prediction unit of FIG. 3 through FIG. 5 is shown. Referring collectively to FIG. 3 through FIG. 6 and beginning in block 601 of FIG. 6, where an IFA is received by the control unit 330 of the DBPU 310. The control unit 330 generates the read addresses for accessing the weight tables 410 by forming Index 0 through Index m as described above. For example, to generate Index 0, in one embodiment, control unit 330A may hash together some number of bits if the TA, and control unit 330A may generate the Index 1 through Index m for weight tables 410B-410n by hashing together the Index 0 value and a different segment of the GHR 345 of the currently executing thread as described above (block 603). The control unit 330A may concurrently access and read the prediction values in the selected banks of each of the weight tables 410, and then provide those prediction values to the summation units 415 (block 605).

The control unit 330B generates the prediction values (e.g., P0-Pn) by separately summing together the prediction values corresponding to a given instruction in a fetched cache line. For example, as described above, the prediction P0 may be created by summing together the four prediction values (e.g., W0_0, W1_0, W2_0, and Wn_0) corresponding to the first and second instructions in the fetched cache line (block 607). The predictions are then provided to the execution pipeline (block 609).

Once an execution unit executes the branch instruction (block 611), the execution unit may notify the IFU 200 that the branch was predicted accurately or not. If the prediction is accurate (block 613), and if the prediction was above the prediction threshold (block 615), the GHR 345 of the currently executing thread is updated (block 617). For example, control unit 330 may check the branch data unit 450 to determine whether the prediction threshold was met. As described above, the execution units may provide the branch taken or not taken information to the IFU 200. Accordingly, the GHR 345 may be updated using that information. The DBPU 310 awaits the next branch instruction IFA as described above in conjunction with block 601.

Referring back to block 615, if the prediction threshold was not met, the control unit 330 may update the prediction values in the weight tables 410 that correspond to the executed branch instruction. If the branch was taken (block 627), the appropriate prediction values are incremented (block 621). The GHR 345 of the currently executing thread is updated (block 623). Operation proceeds to block 601, where the DBPU 310 awaits the next branch instruction IFA.

If the branch was not taken (block 627), the appropriate prediction values are decremented (block 625). The GHR 345 of the currently executing thread is updated (block 623). Operation proceeds to block 601, where the DBPU 310 awaits the next branch instruction IFA.

Referring back to block 613, if the prediction was not accurate, and the prediction was taken (block 619), the appropriate prediction values are decremented (block 625). The GHR 345 of the currently executing thread is updated (block 623). Operation proceeds to block 601, where the DBPU 310 awaits the next branch instruction IFA. However, if the prediction was not taken (block 619), the appropriate prediction values are incremented (block 621). The GHR 345 of the currently executing thread is updated (block 623). Operation proceeds to block 601, where the DBPU 310 awaits the next branch instruction IFA.

It is noted that the control unit 330 and the weight tables 410 may be shared across all threads. However, as mentioned above, since each GHR 345 may be thread specific, the prediction values in the weight tables 410 may be correlated to the direction branch history of a particular thread.

Exemplary System Embodiment

Figure 7:
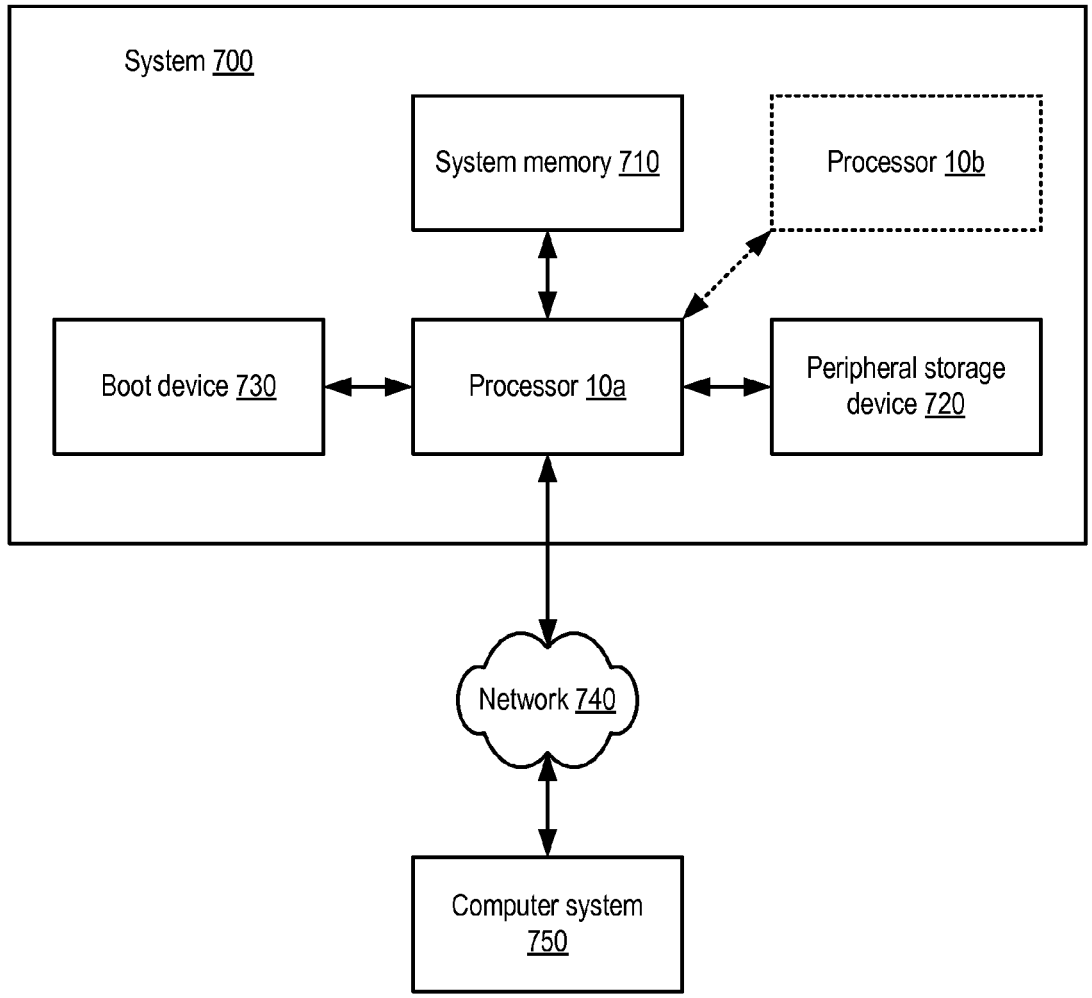
FIG. 7 is a block diagram of one embodiment of a computer system including the multithreaded processor of FIG. 1.

As described above, in some embodiments, processor 10 of FIG. 1 may be configured to interface with a number of external devices. One embodiment of a system including processor 10 is illustrated in FIG. 7. In the illustrated embodiment, system 700 includes an instance of processor 10, shown as processor 10a, that is coupled to a system memory 710, a peripheral storage device 720 and a boot device 730. System 700 is coupled to a network 740, which is in turn coupled to another computer system 750. In some embodiments, system 700 may include more than one instance of the devices shown. In various embodiments, system 700 may be configured as a rack-mountable server system, a standalone system, or in any other suitable form factor. In some embodiments, system 700 may be configured as a client system rather than a server system.

In some embodiments, system 700 may be configured as a multiprocessor system, in which processor 10a may optionally be coupled to one or more other instances of processor 10, shown in FIG. 7 as processor 10b. For example, processors 10a-b may be coupled to communicate via their respective coherent processor interfaces 140.

In various embodiments, system memory 710 may comprise any suitable type of system memory as described above, such as FB-DIMM, DDR/DDR2/DDR3/DDR4 SDRAM, or RDRAM®, for example. System memory 710 may include multiple discrete banks of memory controlled by discrete memory interfaces in embodiments of processor 10 that provide multiple memory interfaces 130. Also, in some embodiments, system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 720 may be coupled to processor 10 via peripheral interface(s) 150 of FIG. 1.

As described previously, in one embodiment boot device 730 may include a device such as an FPGA or ASIC configured to coordinate initialization and boot of processor 10, such as from a power-on reset state. Additionally, in some embodiments boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc. In some embodiments, processor 10 may be configured to communicate with network 740 via network interface(s) 160 of FIG. 1.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A multithreaded microprocessor comprising:
an instruction fetch unit configured to fetch and maintain a plurality of instructions belonging to one or more threads; and
one or more execution units configured to concurrently execute the one or more threads;
wherein the instruction fetch unit includes a conditional branch prediction unit configured to provide, for each of the one or more threads, a direction branch prediction in response to receiving an instruction fetch address of a current conditional branch instruction, wherein the conditional branch prediction unit includes:
a plurality of storages each including a plurality of entries, wherein each entry is configured to store one or more prediction values, and each prediction value of a given storage corresponds to at least one conditional branch instruction in a cache line; and
a control unit coupled to the plurality of storages and configured to generate a separate index value for accessing each storage, wherein the control unit is configured to generate a first index value for accessing a first storage by hashing a plurality of different portions of the instruction fetch address, and to generate each other index value for accessing each other respective storage by hashing the first index value with a different portion of direction branch history information for each storage.

2. The processor as recited in claim 1, wherein the branch prediction unit further includes a second plurality of storages each corresponding to a respective thread of the one or more threads for storing the direction branch history information, wherein each of the second plurality of storages is configured to store a plurality of direction results of previously executed conditional branch instructions for the corresponding thread.

3. The processor as recited in claim 1, wherein to provide each direction branch prediction, the control unit is configured to sum together the prediction values from each of the plurality of storages that correspond to a same conditional branch instruction.

4. The processor as recited in claim 1, wherein each prediction value represents a probability of a particular conditional branch instruction that is associated with a currently executing thread of the one or more threads being taken.

5. The processor as recited in claim 1, wherein a direction branch prediction corresponding to a zero or a positive number corresponds to a taken branch.

6. The processor as recited in claim 1, wherein in response to determining a given direction branch prediction for a particular conditional branch instruction is inaccurate, the control unit is configured to update each prediction value corresponding to the particular conditional branch prediction.

7. The processor as recited in claim 1, wherein in response to determining a given direction branch prediction for a particular conditional branch instruction is inaccurate, the control unit is configured to decrement each prediction value corresponding to the particular conditional branch prediction if the given direction branch prediction inaccurately predicted a taken branch, and to increment each prediction value corresponding to the particular conditional branch prediction if the given direction branch prediction inaccurately predicted a not taken branch.

8. The processor as recited in claim 1, wherein in response to determining a given direction branch prediction for a particular conditional branch instruction is below a minimum threshold value, the control unit is configured to update each prediction value corresponding to the particular conditional branch instruction.

9. The processor as recited in claim 1, wherein in response to determining a given direction branch prediction for a particular conditional branch instruction is below a minimum threshold value, the control unit is configured to decrement each prediction value corresponding to the particular conditional branch instruction if the given direction branch prediction is an accurately predicted not taken branch, and to increment each prediction value corresponding to the particular conditional branch instruction if the given direction branch prediction is an accurately predicted taken branch.

10. The processor as recited in claim 1, wherein each of the plurality of storages comprises a memory array having independently accessible banks, wherein two or more banks are concurrently accessible.

11. The processor as recited in claim 10, wherein each of the plurality of storages includes a decode unit configured to detect a collision in which a read operation and a write operation are directed to a same bank, and in response to detecting the collision, the decode unit is configured to allow the write operation to occur, and to force read data to be all zeroes.

12. The processor as recited in claim 11, wherein in response to detecting that the read operation and the write operation are directed to a same address, the decode unit is further configured to allow the write operation to occur and to provide write data as read data.

13. A method comprising:
an instruction fetch unit fetching a plurality of instructions belonging to one or more threads;
one or more execution units concurrently executing the instructions from the one or more threads;
a direction branch prediction unit providing for each of the one or more threads, a direction branch prediction for one or more conditional branch instructions in a cache line in response to receiving an instruction fetch address of a current conditional branch instruction;
a control unit storing within each entry of a plurality of storages, one or more prediction values, wherein each prediction value of a given storage corresponds to at least one conditional branch instruction in the cache line; and
the control unit generating a separate index value for accessing each storage, wherein the control unit further generating a first index value for accessing a first storage by hashing a plurality of different portions of the instruction fetch address, and generating each other index value for accessing each other respective storage by hashing the first index value with a different portion of direction branch history information for each storage.

14. The method as recited in claim 13, further comprising the fetch unit storing the direction branch history information within a second plurality of storages, wherein each of the second plurality of storages corresponds to a respective thread of the one or more threads, wherein the direction branch history information comprises a plurality of direction results of previously executed conditional branch instructions for the corresponding thread.

15. The method as recited in claim 13, further comprising the control unit summing together the prediction values from each of the plurality of storages that correspond to a same conditional branch instruction to provide each direction branch prediction.

16. The method as recited in claim 13, further comprising the control unit concurrently accessing two or more of a plurality of independently accessible banks of each of the plurality of storages.

17. The method as recited in claim 13, further comprising in response to the control unit detecting a collision in which a read operation and a write operation are directed to a same bank, the decode unit allowing the write operation to occur, and forcing read data to be all zeroes.

18. A system comprising:
a multithreaded processor including a plurality of multithreaded processor cores, wherein each multithreaded processor core includes:
an instruction fetch unit configured to fetch and maintain a plurality of instructions belonging to one or more threads; and
one or more execution units configured to concurrently execute the one or more threads;
wherein the instruction fetch unit includes a conditional branch prediction unit configured to provide for each of the one or more threads, a direction branch prediction for one or more conditional branch instructions in a cache line in response to receiving an instruction fetch address of a current conditional branch instruction, wherein the conditional branch prediction unit includes:
   a plurality of storages each including a plurality of entries, wherein each entry is configured to store one or more prediction values, and each prediction value of a given storage corresponds to at least one conditional branch instruction in the cache line; and
   a control unit coupled to the plurality of storages and configured to generate a separate index value for accessing each storage, wherein the control unit is configured to generate a first index value for accessing a first storage by hashing a plurality of different portions of the instruction fetch address, and to generate each other index value for accessing each other respective storage by hashing the first index value with a different portion of direction branch history information for each storage.

19. The system as recited in claim 18, wherein the branch prediction unit further includes a second plurality of storages each corresponding to a respective thread of the one or more threads for storing the direction branch history information, wherein each of the second plurality of storages is configured to store a plurality of direction results of previously executed conditional branch instructions for the corresponding thread.

20. The system as recited in claim 18, wherein to provide each direction branch prediction, the control unit is configured to sum together the prediction values from each of the plurality of storages that correspond to a same conditional branch instruction.

* * * * *

UNITED STATES PATENT AND TRADEMARK OFFICE
CERTIFICATE OF CORRECTION

| | | |
|---|---|---|
| PATENT NO. | : 8,904,156 B2 | Page 1 of 1 |
| APPLICATION NO. | : 12/578859 | |
| DATED | : December 2, 2014 | |
| INVENTOR(S) | : Shah et al. | |

It is certified that error appears in the above-identified patent and that said Letters Patent is hereby corrected as shown below:

In the Specification

In column 15, line 12, delete "includes" and insert -- include --, therefor.

In column 18, line 34, delete "that" and insert -- than --, therefor.

In column 18, line 51, delete "TA," and insert -- IFA, --, therefor.

Signed and Sealed this
Twenty-fifth Day of August, 2015

Michelle K. Lee
*Director of the United States Patent and Trademark Office*